United States Patent [19]
Hoffmann

[11] Patent Number: 4,690,862
[45] Date of Patent: Sep. 1, 1987

[54] INTEGRAL COMPOSITE PROFILE OF CELLULAR AND NON-CELLULAR RESINS AND A DUAL EXTRUSION METHOD FOR ITS MANUFACTURE

[75] Inventor: Daniel J. Hoffmann, Milwaukee, Wis.

[73] Assignee: Gossen Corporation, Milwaukee, Wis.

[21] Appl. No.: 687,058

[22] Filed: Dec. 28, 1984

[51] Int. Cl.[4] .......................... B37B 5/18; B37B 5/14; B29C 67/22; B29C 47/02
[52] U.S. Cl. .............................. 428/318.6; 156/244.12; 156/244.22; 156/244.27; 264/45.5; 264/46.1; 264/101; 264/171; 428/319.7
[58] Field of Search .................... 264/46.1, 171, 174, 264/45.5, 101; 156/244.12, 244.22, 244.27, 244.26; 428/318.6, 319.7

[56] References Cited

U.S. PATENT DOCUMENTS

| | | | |
|---|---|---|---|
| 1,959,460 | 5/1934 | Crossan | 156/244.12 X |
| 2,072,105 | 3/1937 | Fischer | 156/244.27 X |
| 2,091,124 | 8/1937 | Stewart | 156/244.22 X |
| 2,133,441 | 10/1938 | Fischer | 156/244.27 X |
| 2,716,778 | 9/1955 | Beare | |
| 3,038,205 | 6/1962 | Plummer | 18/47.5 |
| 3,059,292 | 10/1962 | Harris | 20/69 |
| 3,331,900 | 7/1967 | Thomas | 264/46.1 |
| 3,485,912 | 12/1969 | Schrenk et al. | 264/171 |
| 3,780,152 | 12/1973 | Friesner | 156/244.12 X |
| 3,813,199 | 5/1974 | Friesner | 156/244.12 X |
| 3,819,438 | 6/1974 | Witman | 156/79 |
| 3,825,036 | 7/1974 | Stent | 138/174 |
| 3,931,379 | 1/1976 | Cruson et al. | 264/45.5 |
| 4,100,243 | 7/1978 | Wissinger et al. | 264/171 |
| 4,101,047 | 7/1978 | Geppert et al. | 220/258 |
| 4,137,027 | 1/1979 | Ruger | 425/133.5 |
| 4,252,755 | 2/1981 | Normanton et al. | 264/45.9 |
| 4,286,001 | 8/1981 | Frau | 428/68 |
| 4,344,907 | 8/1982 | Herrington | 264/173 |
| 4,369,152 | 1/1983 | Gray et al. | 264/46.4 |
| 4,381,273 | 4/1983 | Azzola | 264/45.9 |
| 4,430,284 | 2/1984 | Rasmussen | 264/171 |
| 4,539,169 | 9/1985 | Nixon et al. | 156/244.27 X |

OTHER PUBLICATIONS

Webster's New Collegiate Dictionary, Springfield, Mass., G. & C. Merriam Co., ©1979, pp. 159, 438.
The Random House College Dictionary, Revised Edition, New York, Random House, Inc., ©1982, pp. 196, 224, 508.
The American Heritage Dictionary, Second College Edition, Boston, Mass., Hougaton Mifflin Co., ©1982, pp. 233, 258, 516.
Webster's New Collegiate Dictionary, Springfield, Mass., G. & C. Merriam Co., ©1961, pp. 120, 319.
Bernhardt, Ernest C., Edt., Processing of Thermoplastic Materials, New York, Reinhold, ©1959, pp. 248, 249, 250, 251, 269, 270, 271.
McKelvey, James M., Polymer Processing, New York, John Wiley and Sons, ©1962, p. 113.
Pearson, J. R. A., Mechanical Principles of Polymer Melt Processing, New York, Pergamon Press, ©1966, pp. 104, 105.
Schenkel, Gerhard, Plastics Extrusion Technology and Theory, New York, American Elsevier Publ. Co., ©1966, pp. 326-329.
Peelman, P. and Johnson, J., Coextrusion Feedblocks and Multimanifold Dies for PVC, Modern Plastics, May 1978, p. 60.
Sneller, J., High-Performance Coextrusions, Modern Plastics, Feb. 1981, p. 36.

Primary Examiner—Philip Anderson
Attorney, Agent, or Firm—Needle & Rosenberg

List continued on next page.

[57] ABSTRACT

The dual extrusion and fusion of cellular and non-cellular resin extrudates produces an integral composite profile having a tongue and groove interlock. The resins are extruded through a common die having overlapping orifices. A bulbous tongue of one extrudate is encapsulated by finger-like projections of a second extrudate and the mated profiles are pulled through a vacuumized sizing box adapted to sealingly receive the cellular portion and to freely receive the non-cellular portion.

7 Claims, 7 Drawing Figures

OTHER PUBLICATIONS

Coextrusion Takes a Giant Step into the Future, Modern Plastics, Aug. 1983.

Collins, S., Coextrusion: The Process and the Promise, Plastics Machinery & Equipment, Nov. 1981, p. 15.

Wood, R., Coextrusion Advance in Cast Film, Sheet, Plastics Machinery & Equipment, Jul. 1984, p. 19.

Smith, D., Analysis of Flow in Coextrusion Dies, Tappi, Apr. 1976, vol. 59, No. 4, p. 115.

Coextrusion Streams into New Products, BR&P, Feb. 1976, p. 20.

Shetty, R. and Han, C. D., A Study of Foam Extrusion, Alche Symposium Series, p. 155.

Cruson, B., Coextrusion, Available from Cosden Oil and Chemical Co., Big Springs, Texas.

Warren, G., Coextrusion, Available from Cosden Oil & Chemical Co., Big Springs, Texas.

Nissel, F., An Introduction to Flat Die Coextrusion, Available from Welex, Inc., Blue Bell, Pa.

Johnson, J., Multi-Manifold Dies, Available from Johnson Plastics Machinery, Chippewa Falls, Wisconsin.

Stedfeld, Robert; "Dual and Coextrusion: The Happy Marriage of Two Unlike Plastics"; *Modern Extrusion,* Feb. 1979; pp. 51–55.

INTEGRAL COMPOSITE PROFILE OF CELLULAR AND NON-CELLULAR RESINS AND A DUAL EXTRUSION METHOD FOR ITS MANUFACTURE

This invention relates to the dual extrusion of a cellular and a non-cellular thermoplastic resin. It relates more particularly to a composite extrudate and to a method for making it in which the cellular and non-cellular profiles are mechanically interlocked during the extrusion procedure. It relates still more particularly to a composite extrudate in which the profiles are fused together.

Until this invention, the fabrication of a window or door casing incorporating a flexible weatherstrip has been either very labor intensive or has required the use of uneconomical amounts of expensive resins. To install a weatherstrip in the edge of a wooden casing, a groove is routed out of the edge, the tongue of a flexible plastic strip is fed into the groove, and staples are driven through a lip of the groove into the tongue. The fabrication of a weatherstripped casing from a combination of a rigid PVC resin and a flexible PVC resin may be done by the co-extrusion of mated profiles of each resin but the large amount of rigid PVC that is required to make a mechanically strong casing makes this approach economically unattractive. The replacement of the rigid PVC by a cellular PVC reduces the cost because less of the resin itself is used but until the time of this invention the provision of a weatherstrip for a cellular plastic casing was done by co-extruding flexible and rigid resins to form a weatherstrip, extruding cellular resin to form casing stock, and mechanically attaching the rigid element of the weatherstrip to the cellular casing.

It is an object of this invention to provide a method for integrating cellular and non-cellular extrudates by dual extrusion to form a strong, practically inseparable composite profile.

It is another object of this invention to provide a cellular thermoplastic casing stock having a non-cellular thermoplastic element fused and mechanically interlocked therein.

It is a further object of this invention to provide an article of manufacture comprising an integral profile of extruded cellular and non-cellular thermoplastic resins.

It is a related object of this invention to provide an apparatus for the side-by-side extrusion of profiles of cellular and non-cellular thermoplastic resins, and the encapsulation and fusion of a tongued profile of one resin in a grooved profile of the other resin.

It is a further object of this invention to provide a method for interlocking a cellular PVC profile and a non-cellular thermoplastic resin profile during the dual extrusion of such resins.

These and other objects of this invention which will become apparent from the following description thereof are achieved by:

extruding the cellular and non-cellular resins through separate extruders, a common crosshead, and a die having orifices whose profiles overlap to form overlapping extrudates;

encapsulating an overlapped extrudate in an overlapping extrudate by pulling the extrudates through an expansion zone to impose a longitudinal tension on the extrudates while the cellular extrudate expands;

pulling the joined extrudates through a common longitudinal channel of a sizing box at sub-atmospheric pressure, the cellular portion of the joined extrudates being in substantial sealing engagement with the portion of the channel entrance through which it passes and its cell structure being supported by the vacuum during sizing, and the non-cellular portion passing freely into the channel; and cooling the joined extrudates while under sub-atmospheric pressure to form a composite profile.

The apparatus, method, and product of this invention will be understood more fully from the following more detailed description when considered in conjunction with the drawings, in which.

Figure 1:
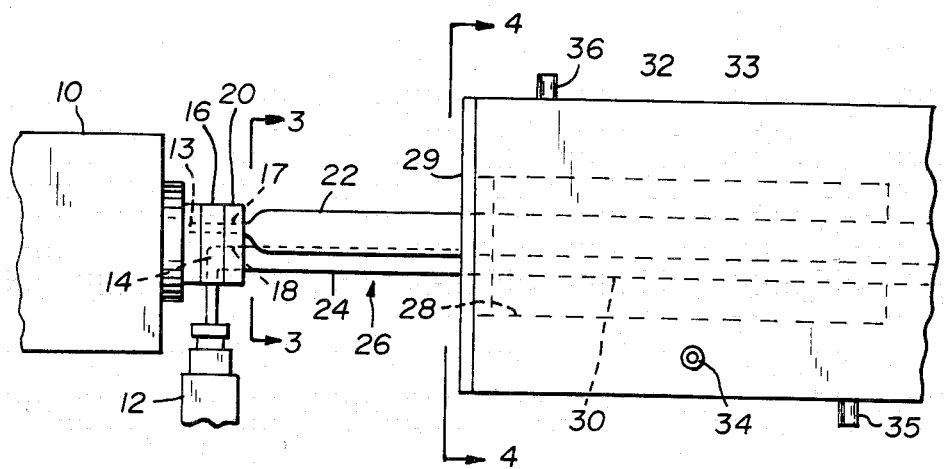
FIG. 1 is a schematic plan view of the apparatus of this invention.
Figure 2:
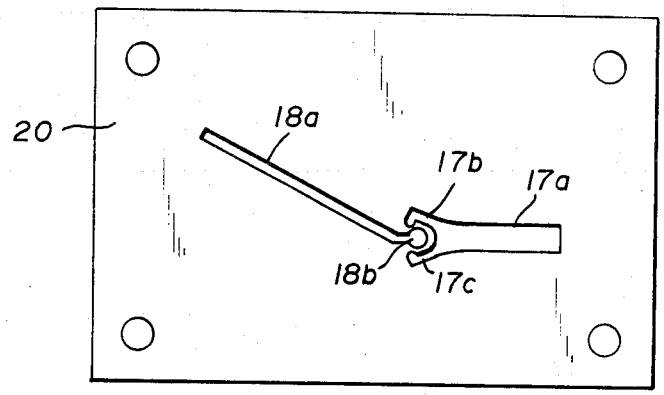
FIG. 2 is an elevational view of the die in the apparatus of FIG. 1.

In FIG. 1, the in-line extruder 10 and the transverse extruder 12 push a cellular PVC resin and a flexible PVC resin, respectively, through the distribution channels 13 and 14 within the crosshead 16 and thence into the channels 17 and 18 of the die 20. As shown in FIG. 2, the shape of the die orifice 18a through which the flexible vinyl flows is that of a ribbon having a bulbous tongue 18b whereas shape of the die or orifice 17a which performs the cellular part includes a pair of divergent fingers 17b and 17c which overlap the tongue 18b.

Figure 3:
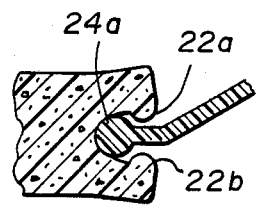
FIG. 3 is a cross-section of the extrudates taken along the line 3—3 of FIG. 1.
Figure 4:
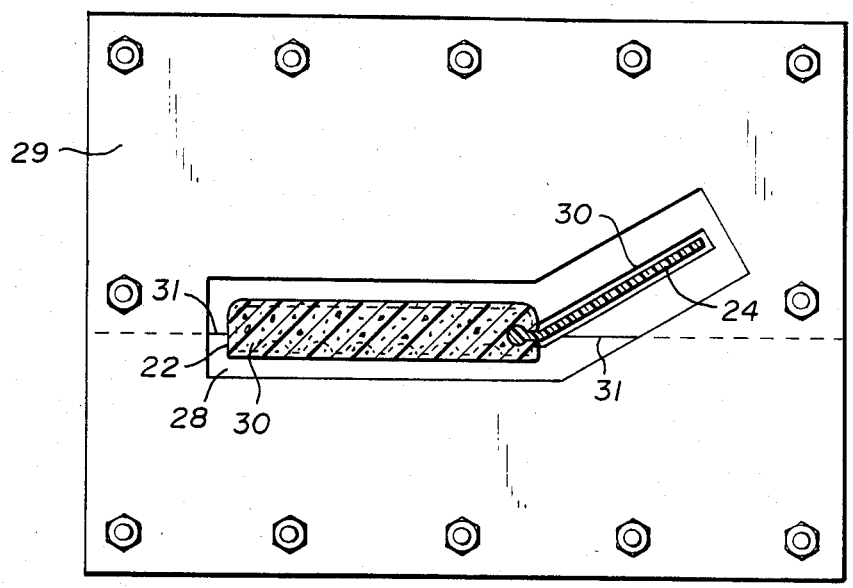
FIG. 4 is an elevational end view showing the relation between the extrudates, shown in section along the line 4—4, and the sizing/cooling means of the apparatus of FIG. 1.

The extrudates 22 and 24 are drawn down in the free space of the expansion zone 26 between the die 20 and a sizing box 28, which is fastened to the cover plate 29, by a puller located downstream from the sizing box 28. The puller is a device commonly used in the extrusion art and thus needs no illustration. The longitudinal tension exerted on the extrudate 22 causes the expanding fingers 22a and 22b in FIG. 3 to converge about and meet the tongue 24a of the flexible extrudate. The joined extrudates are pulled at from about 7 to about 25 lineal feet per minute through the channel 30 which extends longitudinally through the sizing box 28. The line speed is preferably from about 10 to about 18 feet per minute. As shown in FIG. 4, the channel 30 is substantially sealed off from the atmosphere where the cellular portion of the joined extrudates slips into the channel 30 but the exposed portion of the flexible extrudate passes freely into the channel. The clearance between the entrance to the channel 30 and each of the two parallel surfaces, e.g., the top and bottom, of the flexible extrudate may be from about 2 mils to about 25 mils (about 0.05 to about 0.6 mm) but it is preferably from about 5 to about 10 mils. The lateral clearance between the edge of that extrudate and the channel 30, on the other hand, may be from about 100 to about 200 mils.

The sizing box 28 consists essentially of two closely matched metal blocks mated along the longitudinal seam 31, as shown in FIG. 4. The entrance of the sizing box is sealed so as to maintain a vacuum. The appropriate sectors of the channel 30 are formed in the upper block and the lower, intagliate block. The sizing box, gasketed and bolted to the cover plate 29, is submerged in the water bath 32 which has a sealed lid 33 through which a vacuum conduit 34 passes. Water circulating through the bath from the inlet 35 to the outlet 36 cools the sizing box which in turns draws heat away from the extrudates in the channel 30. A vacuum of from about 1 to about 15 inches of mercury (about $3 \times 10^3$ to about $50 \times 10^3$ Pa) is effected above the water level by a vacuum pump (not shown) connected to the conduit 34. The reduction of pressure within the channel 30 may be effected by means of a plurality of capillaries extending from the channel to the surfaces of the metal blocks or by making use of the fact that the seam 31 is not perfectly tight.

The partial vacuum within the channel 30 allows the expansive force of the gases in the resin to press the resin against the contours of the channel despite the lower temperature, thus counteracting the tendency of the cellular extrudate to contract and deform as it cools. The vacuum supports the cell structure of the cellular resin during sizing. Given the necessity of the partial vacuum within the channel 30, it is then necessary that the cellular extrudate 22 fill its portion of the channel as it enters. If the extrudate 22 is smaller than the channel, small depressions known as dimples may appear on the surface or, worse yet, the resin may expand so much as to leave a hollow space in the extrudate. If the extrudate 22 is too much larger than the channel, however, the surface of the finished profile will be blemished by chatter marks, cuts, and bumps. A section of the extrudate 22 may, for example, be about 60 mils (1.5 mm) larger at its maximum thickness than the corresponding section of the channel 30. To facilitate the slippage of the extrudate 22 into the channel 30, the margins of the channel are rounded on a radius of from about 30 to about 60 mils. The "substantial sealing engagement" of the extrudate 22 with the channel 30 entrance is one which shuts out all air from the surroundings, except for the layers of air which cling to the surfaces of the extrudate, but still does not hinder the travel of the extrudate into the channel 30. The proper filling of the channel 30 by the extrudate 22 is dependent upon the relative sizes, in section, of the extruder die orifice 17a and the channel 30, the extruder screw speed, and the distance between the sizing box 28 and the die 20. The relative sizes of the orifice 17a and the channel 30, hence that of the finished cellular profile, is dependent upon the die land length, i.e., the thickness of the die 20, and the resin formulation. For example, if the land length is 1 inch the orifice 17a may be about half as large as the channel 30, in section; the orifice 17a may be about one-third as large as the channel 30, in section, when the land is one-half inch long.

The flexible, non-cellular extrudate, on the other hand, is not subject to the "dimpling" and "piping" of its mate within the channel 30. It would, however, be susceptible to being wrenched away from the cellular extrudate if it were made to fit snugly within the channel 30. It has to be loose flowing so as to be able to slide without binding ito the channel 30 to avoid tearing. Thus, the extrudate 24 is given ample clearance as it passes into and through the channel. It is a surprising aspect of this invention that the hot flexible extrudate 24 is not deformed or torn from its cellular mate by the thrust of air rushing into the gap between the extrudate 24 and the channel entrance to try to fill the vacuum being pulled by the pump.

Figure 5:
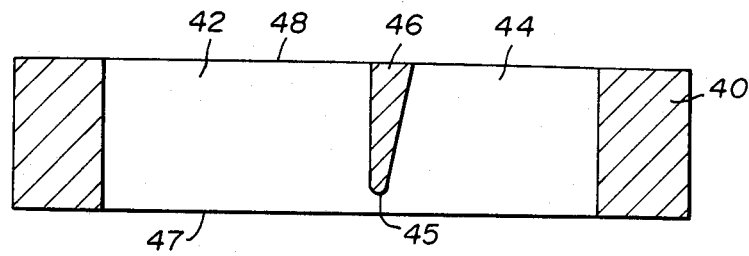
FIG. 5 is a cross section of a die in a preferred embodiment of the apparatus of this invention.
Figure 6:
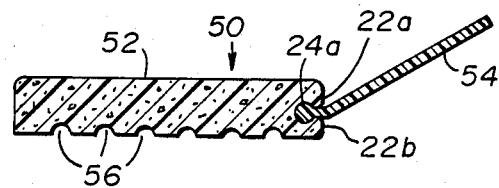
FIG. 6 is a cross section of a weatherstripped casing of this idvention.

In FIG. 5, the die 40 has channels 42 and 44 which are connected at the shunt 45 of the septum 46 intermediate the die face 47 and the rear margin 48. Shunt 45 is a connection approximately one-eighth to one-quarter inch behind the die orifice where contact is made between the cellular and non-cellular materials. The channels 42 and 44 extend separately toward the face 47 for a preferred distance of from about 75% to about 90% of the thickness of the die 40. More preferably, the shunt 45 occurs at from about 85% to about 90% of the distance from the rear margin 48. For example, in a die 40 having a thickness of about 1 inch (2.5 cm) the shunt 45 is about ⅛ inch (0.3 cm) away from the face 47. The convergence of the hot extrudates before they emerge from the die 40 promotes the encapsulation of the tongue 24a by the fingers 22a and 22b as shown in FIG. 6 wherein the integral profile 50 comprises the cellular jamb 52 and the flexible strip 54. The flutes 56 are formed by the lower, intagliate block of the sizing box 28.

Figure 7:
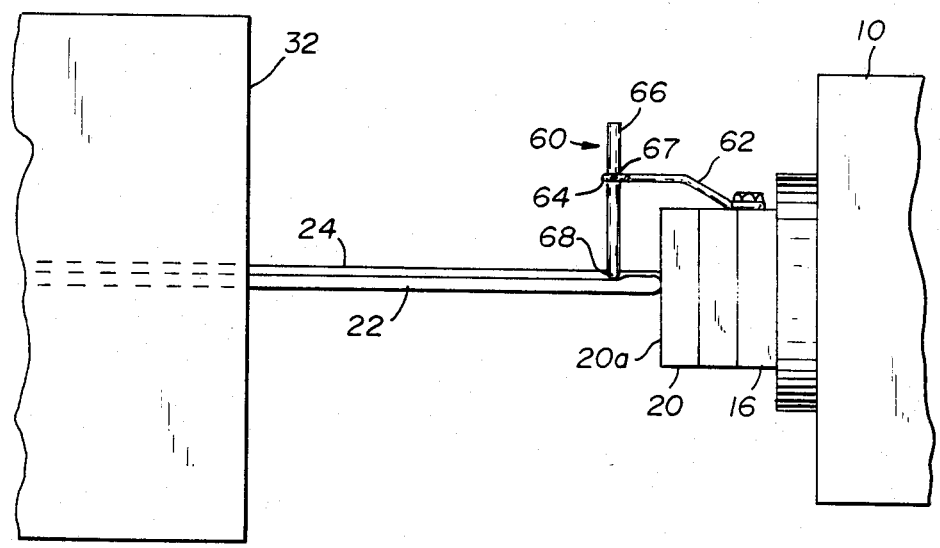
FIG. 7 is a side view of the apparatus of this invention showing an optional accessory.

Another aid for the encapsulation of the tongue 24a by the fingers 22a and 22b is shown in FIG. 7 wherein the snubber 60 is slidably mounted in front of the die face 20a. The strap 62 is mounted on the crosshead 16 and has a bushing 64 in its distal end through which the rod 66 slides. The set-screw 67 locks the rod in the desired position. At the lower end of the rod 66 there is a beveled foot 68 which is adapted to deflect the expanding finger 22a of the cellular extrudate toward the tongue 24a of the flexible extrudate.

Cellular thermoplastic resin compositions are well known in the extrusion art and are available commercially. The cellular resin may be any thermoplastic resin which can be foamed within an extruder. In addition to the cellular poly-vinyl chloride mentioned above, the cellular resin is exemplified by polystyrene, polyethylene, polyesters, nylons, and polycarbonates. Compositions may be formulated to impart the desired properties to the fluxed resin and to the final product. Conventional blowing agents, such as p,p'-oxybis (benzenesulfonyl hydrazide), more commonly known by its acronym OBSH, and azodicarbonamide (ABFA) are used in amounts sufficient to impart a specific gravity to the expanded extrudate of from about 0.4 to about 1. As a practical matter, the specific gravity of the expanded extrudate is preferably about 0.8 or less. A cellular PVC formulation, for example, comprises a relatively low molecular weight poly-vinyl chloride resin (as compared to the resin in a flexible PVC formulation), an impact modifier such as chlorinated polyethylene, a barium-cadmium heat stabilizer, a lubricant such as calcium stearate or paraffin wax, a filler such as calcium carbonate, a processing aid such as poly-methyl methacrylate, and azodicarbonamide as the blowing agent.

The cellular/non-cellular pairs are preferably those in which the resins are compatible, i.e., interfusible. When the cellular resin is PVC, for example, the non-cellular resin is preferably a thermoplastic resin such as a flexible or rigid PVC, ABS, or a copolymer of ethylene and vinyl acetate which will bond to the cellular PVC extrudate when the surface temperatures of the extrudates are sufficient to cause fusion of the extrudates so that an integral composite profile is produced. Cellular versions of the same resin are, of course, compatible but the thermoplastic elastomers may be paired with such diverse cellular resins as foamed polystyrene, foamed polyethylene and foamed PVC. The thermoplastic elastomers (TPE) have physical properties similar to those of vulcanized, thermoset rubbers. Block copolymers such as styrene/butadiene/styrene and polyester/polyether are examples of TPE. Blends of a crystalline polyolefin with an ethylene-propylene copolymer such as EPR or EPDM are another type of thermoplastic elastomer. The various types of these uncured elastomers are described in *Modern Plastics Encyclopedia* 1983-1984, pp. 95-97, (McGraw-Hill). A composite profile in which the non-cellular resin does not bond to the cellular resin, a polyolefin/cellular PVC pair for example, still has the mechanical interlock but it can be pulled apart whereas an integral profile in which the cellular and non-cellular extrudates are fused together is virtually inseparable.

A typical formulation for a flexible PVC resin composition comprises a high molecular weight poly-vinyl chloride resin, a plasticizer such as di-octyl phthalate, a calcium carbonate filler, a barium-cadmium heat stabilizer, stearic acid, and silica. A flexible PVC extruding compound sold by Goodrich under the trademark Geon 83718 is a preferred non-cellular resin for this invention.

The zone temperatures in the cellular and non-cellular resin extruders are those conventially employed for such resins. For the dual extrusion of a cellular PVC resin and a flexible PVC resin, for example, the zone temperature range from about 300° to about 400° F. (149° to 205° C.) in the cellular resin extruder 10 and from about 260° to about 300° F. (126° to 149° C.) in the extruder 12. The preferred temperature for the die 20 and the die 40 is about 325° F. to ensure that the surface temperatures of such mutually fusible resins are high enough to weld the extrudates together.

The compression ratio for a cellular PVC resin in the extruder 10 is from about 2.1:1 to about 2.6:1, preferably from about 2.3:1 to about 2.5:1. In the extruder 12, the compression ratio for a flexible PVC resin is from about 2.3:1 to about 3:1, preferably about 2.7:1.

Although the invention has been described in terms of an embodiment wherein the non-cellular extrudate is encapsulated by the cellular extrudate, the reverse embodiment is also within the scope of the invention. Thus, an integral profile in which the extrudates have a tongue and groove relationship may be made wherein the groove is formed in a rigid non-cellular extrudate and the tongue is formed from a cellular resin. The production of an integral folding door or curtain by the method of this invention is envisioned, also. An array of cellular resin slats joined by flexible resin hinges may be produced through a die having a multiplicity of overlapping orifices alternately repeating a double grooved profile and a double tongued profile and through a sizing box having a channel adapted to receive the cellular resin in a substantially sealing engagement and to receive the flexible resin freely. Also, a capstock of rigid resin may be extruded simultaneously through the die to provide abrasion resistance to the cellular portion of the composite profile.

Various other modifications of the invention may be made while remaining within the scope of the appended claims.

The subject matter claimed is:

1. An integral composite profile of a cellular thermoplastic resin and a non-cellular thermoplastic resin in which a first profile has a tongue and a second profile has a pair of fingers which encapsulate and are fused to the tongue of the first profile.

2. A method of dual extrusion for forming a cellular resin and a non-cellular resin into a unitary composite profile, said method comprising:

extruding the cellular and non-cellular resins through separate extruders, through a common cross-head and a die having orifices whose profiles overlap to form overlapping extrudates;

encapsulating an overlapped extrudate in an overlapping extrudate by pulling the extrudates through an expansion zone to impose a longitudinal tension on the extrudates while the cellular extrudate expands;

pulling the joined extrudates through a common longitudinal channel of a sizing box at sub-atmospheric pressure, the cellular portion of the joined extrudates being in substantial sealing engagement with the portion of the channel entrance through which it passes and the non-cellular portion passing into the channel with a clearance of from about 10 to about 20 mils; and cooling the joined extrudates while under sub-atmospheric pressure.

3. The method of claim 2 wherein the encapsulation is initiated while the surface temperatures of the extrudates are sufficient to cause fusion of the extrudates.

4. The method of claim 2 wherein the resins remain separated during their passage through the die.

5. The method of claim 2 wherein the resins remain separated for from about 75% to about 90% of the die thickness.

6. The method of claim 2 wherein the encapsulation of a non-cellular extrudate by a cellular extrudate is aided by deflecting the expanding cellular extrudate toward the non-cellular extrudate.

7. The method of claim 2, wherein the cell structure of the cellular resin is supported by a vacuum while in a sizing box at sub-atmospheric pressure so that a non-cellular extrude may be fused to said cellular extrude without deformation.

* * * * *

REEXAMINATION CERTIFICATE (3464th)
United States Patent [19]
Hoffmann

[11] B1 4,690,862
[45] Certificate Issued Mar. 17, 1998

[54] INTEGRAL COMPOSITE PROFILE OF CELLULAR AND NON-CELLULAR RESINS AND A DUAL EXTENSION METHOD FOR ITS MANUFACTURE

[75] Inventor: Daniel J. Hoffmann, Milwaukee, Wis.

[73] Assignee: The Gossen Corporation, Milwaukee, Wis.

Reexamination Requests:
No. 90/004,523, Jan. 21, 1997
No. 90/004,549, Feb. 13, 1997

Reexamination Certificate for:
Patent No.: 4,690,862
Issued: Sep. 1, 1987
Appl. No.: 687,058
Filed: Dec. 28, 1984

[51] Int. Cl.$^6$ .................. B32B 5/18; B32B 5/14; B29C 67/22; B29C 47/02
[52] U.S. Cl. .................. 428/318.6; 156/244.12; 156/244.22; 156/244.27; 264/45.5; 264/46.1; 264/101; 264/171; 428/319.7
[58] Field of Search .................. 428/318.6, 319.7; 156/244.12, 244.22, 244.27; 264/45.5, 46.1, 101, 171

[56] References Cited

U.S. PATENT DOCUMENTS

| | | | |
|---|---|---|---|
| 1,959,460 | 5/1934 | Crossan | 156/244.12 X |
| 2,072,105 | 3/1937 | Fischer | 156/244.27 X |
| 2,091,124 | 8/1937 | Stewart | 156/244.22 X |
| 2,133,441 | 10/1938 | Fischer | 156/244.27 X |
| 2,537,977 | 1/1951 | Dulmage | |
| 2,587,930 | 3/1952 | Uschmann | |
| 2,682,292 | 6/1954 | Nagin | |
| 2,716,778 | 9/1955 | Beare | |
| 2,872,965 | 2/1959 | Sisson | |
| 2,941,965 | 6/1960 | Ingram | |
| 3,038,205 | 6/1962 | Plummer | |
| 3,042,972 | 7/1962 | Lafferty | |

(List continued on next page.)

FOREIGN PATENT DOCUMENTS

| | | |
|---|---|---|
| 857814 | 1/1961 | United Kingdom . |
| 971352 | 9/1964 | United Kingdom . |

OTHER PUBLICATIONS

1983 Brochure of Victorian Molding.
*Webster's New Collegiate Dictionary* Springfield Mass. G. & C. Merriam Co., 1979, pp. 159, 438.
*The Random House College Dictionary* Revised Edition. New York, Random House, Inc., ©1982, pp. 196, 224, 508.
*The American Heritage Dictionary* Second College Edition. Boston Mass, Houghton Mifflin Co., ©1982, pp. 233, 258, 516.
Stedfeld, Robert; "Dual and Coextrusion: the Happy Marriage of Two Unlike Plastics" *Modern Extrusion*, Feb., 1979; pp. 51–55.
Webster's New Collegiate Dictionary, Springfield, Mass, G. & C. Merriam Co., ©1961, pp. 120, 319.
Bernhardt, Ernest C. Edt. *Processing of Thermoplastic Materials*. New York, Reinhold, ©1959, pp. 248, 249, 250, 251, 269, 270, 271.
McKelvey James M. *Polymer Processing* New York, John Wiley and Sons, ©1962, p. 113.
Pearson J. R. A. *Mechanical Principles of Polymer Melt Processing*. New York, Pergamon Press, ©1966, pp. 104, 105.
Schenkel, Gerhard *Plastics Extrusion Technology and Theory* New York, American Elsevier Publ., Co., ©1966, pp. 326–329.

*Primary Examiner*—Terrel Morris

[57] ABSTRACT

The dual extrusion and fusion of cellular and non-cellular resin extrudates produces an integral composite profile having a tongue and groove interlock. The resins are extruded through a common die having overlapping orifices. A bulbous tongue of one extrudate is encapsulated by finger-like projections of a second extrudate and the mated profiles are pulled through a vacuumized sizing box adapted to sealingly receive the cellular portion and to freely receive the non-cellular portion.

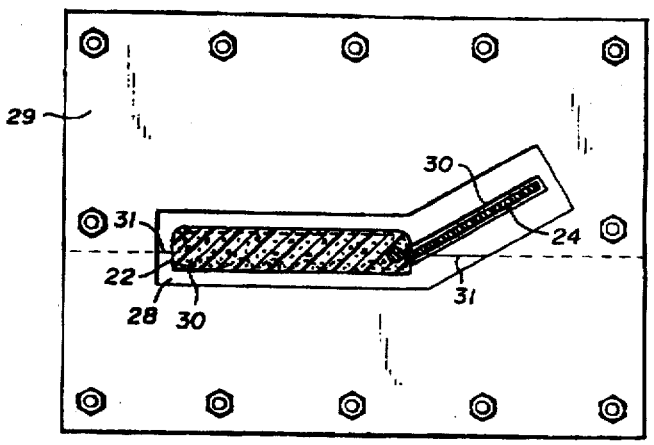

U.S. PATENT DOCUMENTS

| | | |
|---|---|---|
| 3,121,130 | 2/1964 | Wiley et al. . |
| 3,158,529 | 11/1964 | Robitschek et al. . |
| 3,166,454 | 1/1965 | Voelker . |
| 3,170,827 | 2/1965 | Voelker . |
| 3,174,887 | 3/1965 | Voelker . |
| 3,189,941 | 6/1965 | Reifenhäuser . |
| 3,220,902 | 11/1965 | Edwards . |
| 3,222,721 | 12/1965 | Reynolds, Jr. . |
| 3,222,722 | 12/1965 | Reifenhauser . |
| 3,223,761 | 12/1965 | Raley . |
| 3,229,005 | 1/1966 | Reifenhauser . |
| 3,277,225 | 10/1966 | Heard, Jr. . |
| 3,300,554 | 1/1967 | Bachus . |
| 3,321,803 | 5/1967 | Corbett . |
| 3,331,900 | 7/1967 | Thomas .................................. 264/46.1 |
| 3,363,034 | 1/1968 | Noland et al. . |
| 3,387,067 | 6/1968 | McCurdy . |
| 3,413,387 | 11/1968 | Ohsol . |
| 3,413,388 | 11/1968 | Lux et al. . |
| 3,431,163 | 3/1969 | Gilbert . |
| 3,535,824 | 10/1970 | Kessler . |
| 3,668,288 | 6/1972 | Takahashi . |
| 3,685,206 | 8/1972 | Kessler . |
| 3,780,152 | 12/1973 | Friesner ........................ 156/244.12 X |
| 3,782,870 | 1/1974 | Schippers . |
| 3,813,199 | 5/1974 | Friesner ........................ 156/244.12 X |
| 3,931,379 | 1/1976 | Cruson et al. ........................ 264/45.5 |
| 3,956,438 | 5/1976 | Schippers . |
| 4,022,557 | 5/1977 | Johnson . |
| 4,076,262 | 2/1978 | Deventer . |
| 4,107,247 | 8/1978 | Dukess . |
| 4,206,165 | 6/1980 | Dukess . |
| 4,381,273 | 4/1983 | Azzola ................................ 264/45.9 |
| 4,409,165 | 10/1983 | Kim . |
| 4,539,169 | 9/1985 | Nixon et al. .................... 156/244.27 X |
| 4,563,381 | 1/1986 | Woodland . |
| 4,600,461 | 7/1986 | Guy . |

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–7 is confirmed.

New claim 8 is added and determined to be patentable.

*8. An integral composite profile of a cellular thermoplastic resin jamb and a non-cellular thermoplastic resin flexible strip, in which the non-cellular strip profile has a tongue and the cellular jamb profile has a pair of fingers which encapsulate and are fused to the tongue of the strip profile.*

* * * * *